United States Patent
Hong et al.

(10) Patent No.: US 12,025,817 B2
(45) Date of Patent: Jul. 2, 2024

(54) DECORATIVE FILM

(71) Applicant: Shine Optoelectronics (Kunshan) Co., Ltd., Kunshan (CN)

(72) Inventors: Shen Hong, Kunshan (CN); Yulong Gao, Kunshan (CN); Guangzhou Yang, Kunshan (CN)

(73) Assignee: Shine Optoelectronics (Kunshan) Co., Ltd., Kunshan (CN)

( * ) Notice: Subject to any disclaimer, the term of this patent is extended or adjusted under 35 U.S.C. 154(b) by 515 days.

(21) Appl. No.: 17/172,932

(22) Filed: Feb. 10, 2021

(65) Prior Publication Data

US 2021/0191008 A1   Jun. 24, 2021

Related U.S. Application Data

(63) Continuation of application No. PCT/CN2019/099550, filed on Aug. 7, 2019.

(30) Foreign Application Priority Data

Aug. 10, 2018   (CN) .......................... 201810908543.1

(51) Int. Cl.
*G02B 5/08*   (2006.01)
*B32B 3/30*   (2006.01)
(Continued)

(52) U.S. Cl.
CPC .............. *G02B 5/0808* (2013.01); *B32B 3/30* (2013.01); *B32B 27/08* (2013.01); *B32B 27/308* (2013.01);
(Continued)

(58) Field of Classification Search
CPC ......... G02B 5/0808; B32B 3/30; B32B 27/08; B32B 27/308; B32B 27/36; B32B 27/365;
(Continued)

(56) References Cited

U.S. PATENT DOCUMENTS 5,957,458 A * 9/1999 Haas .................. A63F 3/0685
  273/269
7,102,708 B2   9/2006 Johgan et al.
(Continued)

FOREIGN PATENT DOCUMENTS

CN         107708358 A     2/2018
CN         207105800 U  *  3/2018
(Continued)

OTHER PUBLICATIONS

Indian Office Action and Search Report for Application No. 202147008792, issued Jan. 20, 2022 (5 pages).
(Continued)

*Primary Examiner* — Travis M Figg
(74) *Attorney, Agent, or Firm* — Nutter McClennen & Fish LLP

(57) ABSTRACT

The present disclosure discloses a decorative film comprising a support layer and a texture structure. The support layer comprises a first surface and a second surface opposite to each other. The texture structure is provided on the first surface of the support layer. The first surface defines a plurality of dots, and the texture structure is provided with dot textures showing light and shadow highlights at each of the dots and color matching textures located between the dot textures for color matching. The decorative film can show a plurality of light and shadow highlights by setting the dot textures, such that it has a unique decorative effect and a high recognition. And no dazzling light and shadow highlights of the decorative film are shown and the better visual effects are exhibited by setting the color matching textures.

8 Claims, 2 Drawing Sheets

(51) Int. Cl.
  *B32B 27/08* (2006.01)
  *B32B 27/30* (2006.01)
  *B32B 27/36* (2006.01)

(52) U.S. Cl.
  CPC ............ *B32B 27/36* (2013.01); *B32B 27/365* (2013.01); *B32B 2255/10* (2013.01); *B32B 2307/416* (2013.01); *B32B 2451/00* (2013.01)

(58) Field of Classification Search
  CPC .......... B32B 2255/10; B32B 2307/416; B32B 2451/00
  See application file for complete search history.

(56) References Cited

U.S. PATENT DOCUMENTS

| | | | | |
|---|---|---|---|---|
| 2006/0256274 | A1* | 11/2006 | Johgan | G02F 1/13394 349/155 |
| 2010/0068424 | A1 | 3/2010 | Li | |
| 2011/0286092 | A1* | 11/2011 | Chung | G02B 5/136 359/463 |
| 2013/0248095 | A1* | 9/2013 | Hou | B44C 1/17 156/240 |
| 2018/0137787 | A1* | 5/2018 | Utz | C09J 7/403 |

FOREIGN PATENT DOCUMENTS

| | | | |
|---|---|---|---|
| CN | 207105800 | U | 3/2018 |
| CN | 207118164 | U * | 3/2018 |
| CN | 207118164 | U | 3/2018 |
| CN | 109041477 | A | 12/2018 |
| KR | 100938990 | B1 | 1/2010 |

OTHER PUBLICATIONS

International Search Report for Application No. PCT/CN2019/099550, mailed Oct. 30, 2019 [English Translation] (2 Pages).

Chinese Office Action and Search Report for Application No. 201810908543.1, issued Dec. 18, 2019 with English Translation (15 Pages).

Chinese Office Action for Application No. 201810908543.1, issued Jul. 15, 2020 with English Translation (10 Pages).

* cited by examiner

DECORATIVE FILM

CROSS-REFERENCE TO RELATED APPLICATIONS

The present application is a continuation of International Application No. PCT/CN2019/099550, entitled "Decorative Film" and filed on Aug. 7, 2019, which claims priority to Chinese Patent Application No. 201810908543.1, filed on Aug. 10, 2018, each of which are hereby incorporated herein by reference in their entirety.

FIELD OF THE INVENTION

The present disclosure relates to the field of optics, and in particular to a decorative film.

BACKGROUND OF THE INVENTION

With the rapid development of consumer electronics industry, electronic equipment such as a mobile phone, a PAD currently has been widely used with small sizes and versatile functions as a new generation of portable communication device. The design of electronic products is not only limited to the improvement of functions. Designers have focused on the industrial design of consumer electronics products. In order to attract customers, merchants start research and development from structure, function, and appearance of products to design distinctive products.

However, the decorative design of cover of electronic equipment currently focuses on the replacement of materials such as glass, metal and plastic or the replacement of a single color of color layers. It is difficult to meet the higher requirements of users on the aesthetic appearance and artistic sense of electronic equipment, due to the monotonous appearance, the colourless picture, and the poor aesthetics of the cover of electronic equipment, and thus the cover of electronic equipment has poor decorative effects.

SUMMARY OF THE INVENTION

A primary objective of the present disclosure is to provide a decorative film, so as to overcome the defects in the prior art.

In order to accomplish the foregoing objective, the technical solution of the present disclosure includes:

A decorative film, comprising:
A support layer that comprises a first surface and a second surface opposite to each other;
A texture structure that is provided on the first surface of the support layer;
The first surface defines a plurality of dots, and the texture structure is provided with dot textures showing light and shadow highlights at each of the dots and color matching textures located between the dot textures for color matching.

In some embodiments, length and width of the dot textures are defined as L1 and W1, respectively, then $0.1\ mm \leq L1 \leq 1\ mm$, $0.05\ mm \leq W1 \leq 0.5\ mm$, and a spacing between the adjacent dot textures is greater than 0.05 mm.

In some embodiments, a spacing between the two adjacent dot textures is D1 along a length direction of the dot textures, then $0.1\ mm \leq D1 \leq 0.5\ mm$; and a spacing between the two adjacent dot textures is D2 along a width direction of the dot textures, then $0.05\ mm \leq D2 \leq 0.5\ mm$.

In some embodiments, length and width of the color matching textures are defined as L2 and W2, respectively, then L2 and/or W2 is less than 0.05 mm.

In some embodiments, the texture structure comprises a plurality of cylindrical mirrors variable in width forming the dot textures on a wide portion and forming the color matching textures on a narrow portion.

In some embodiments, the plurality of cylindrical mirrors are arranged in rows, and the dot textures of two adjacent cylindrical mirrors are misaligned or arranged on the same axis.

In some embodiments, the plurality of cylindrical mirrors are arranged in rows, and the dot textures are provided between the color matching textures of two adjacent cylindrical mirrors.

In some embodiments, the plurality of cylindrical mirrors are arranged in rows, the dot textures and the color matching textures on the same cylindrical mirror are connected in arc line shape or straight line shape, and the decorative film shows light and shadow stripes along an arrangement direction.

In some embodiments, a projection of the cylindrical mirror on the first surface has a first side and a second side opposite to each other in an extension direction, and the first side and the second side are wave curves, and the first side and the second side are mirrored.

In some embodiments, the texture structure comprises a first cylindrical mirror and a second cylindrical mirror, the first cylindrical mirror has a first side and a second side, and the second cylindrical mirror has a third side and a fourth side that are mirrored, and the second side and the third side are arranged adjacently and in parallel.

The present disclosure has advantageous effects over the prior art:

The decorative film is engraved with a plurality of light and shadow highlights by setting the dot textures, such that it has a unique decorative effect and a high recognition. And no dazzling light and shadow highlights of the decorative film are shown and the better visual effects are exhibited by setting the color matching textures.

BRIEF DESCRIPTION OF THE DRAWINGS

To describe the technical solutions in the embodiments of the present application or the prior art more clearly, the following briefly introduces the accompanying drawings required for describing the embodiments or the prior art. Apparently, the accompanying drawings in the following description show merely some embodiments of the present application, and those skilled in the art may still derive other drawings from these accompanying drawings without creative efforts.

DETAILED DESCRIPTION OF THE INVENTION

Figure 1:
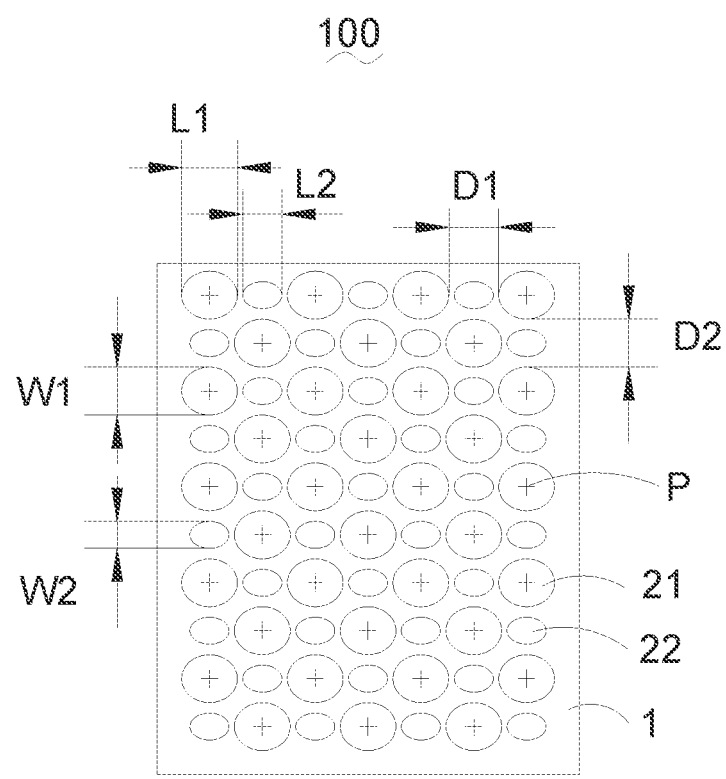
FIG. 1 is a schematic top view illustrating a decorative film according to the present disclosure.

In view of the shortcomings in the prior art, the inventor of the present disclosure proposes the technical solutions of the present disclosure through long-term studies and a lot of practice. The technical solutions and implementations and principles are further explained below.

It should first be noted that the definitions of the terms mentioned in the specification of the present disclosure are known to those skilled in the art. Unless otherwise defined, all technical and scientific terms used herein have the same meaning as generally understood by those skilled in the art to which the present disclosure pertains. The terminology used herein is only for the purpose of describing the particular embodiments, and is not intended to limit the present disclosure. The term "and/or" as used herein includes any and all combinations of one or more of the associated listed items.

The present disclosure discloses a decorative film comprising a support layer and a texture structure. The support layer comprises a first surface and a second surface opposite to each other. The texture structure is provided on the first surface of the support layer. The first surface defines a plurality of dots, and the texture structure is provided with dot textures showing light and shadow highlights at each of the dots and color matching textures located between the dot textures for color matching. The decorative film can show a plurality of light and shadow highlights by setting the dot textures, such that it has a unique decorative effect and a high recognition. And no dazzling light and shadow highlights of the decorative film are shown and the better visual effects are exhibited by setting the color matching textures.

Preferably, length and width of the dot textures are defined as L1 and W1, respectively, then 0.1 mm≤L1≤1 mm, 0.05 mm≤W1≤0.5 mm, and a spacing between the adjacent dot textures is greater than 0.05 mm. The size and spacing settings of the dot textures (e.g., L1 is 0.3 mm, 0.5 mm, 0.8 mm, and W1 is 0.08 mm, 0.1 mm, 0.5 mm) render the distribution of light and shadow highlights clear, independent, and distinctive.

Preferably, a spacing between the two adjacent dot textures is D1 along a length direction of the dot textures, then 0.1 mm≤D1≤0.5 mm; and a spacing between the two adjacent dot textures is D2 along a width direction of the dot textures, then 0.05 mm≤D2≤0.5 mm. For example, D1 is 0.2 mm, 0.35 mm, 0.45 mm, and D2 is 0.08 mm, 0.1 mm, 0.3 mm. Thus more visible light and shadow highlights are shown.

Preferably, length and width of the color matching textures are defined as L2 and W2, respectively, then L2 and/or W2 is less than 0.05 mm. For example, W2 is 0.02 mm. Thus the excellent color matching is exhibited.

Preferably, the texture structure comprises a plurality of cylindrical mirrors with uneven widths forming the dot textures on a wide portion and forming the color matching textures on a narrow portion. The dot textures and the color matching textures are set by the width of the cylindrical mirrors. The simple design, uncomplicated process and excellent highlight effect are exhibited. The height at the dot textures can be slightly above or equal to the height at the color matching textures. The cross-sectional shape of the cylindrical mirrors can be arched, semi-circular, triangular, quadrangular, polygonal, trapezoidal and irregular.

Preferably, the plurality of cylindrical mirrors are arranged in rows, and the dot textures of two adjacent cylindrical mirrors are misaligned or arranged on the same axis. For example, the dot textures of one cylindrical mirror correspond to a spacing between two adjacent dot textures of another cylindrical mirror. In this way, the dot textures are arranged more densely and the highlights shown simultaneously are well-spaced, and the more abundant effects are exhibited.

Preferably, the plurality of cylindrical mirrors are arranged in rows, and the dot textures are provided between the color matching textures of two adjacent cylindrical mirrors. The large spacing between the color matching textures of two adjacent cylindrical mirrors facilitates setting of the dot textures, so that the number of well-spaced dot textures distribution can be increased, the rich highlights are shown and the excellent decorative effects are exhibited.

Preferably, the plurality of cylindrical mirrors are arranged in rows, the dot textures and the color matching textures on the same cylindrical mirror are connected in arc line shape or straight line shape, and the decorative film shows light and shadow stripes along an arrangement direction. There is a curve change on the cylindrical mirrors during connections by arcs. After the cylindrical mirrors are arranged, the decorative film can show light and shadow bright fringes due to the curve change in light, so that the decorative film has bright fringes in addition to the highlights. The bright fringes can move with the visual movement, such that the more abundant optical effects are exhibited and the excellent decorative effects are exhibited.

Preferably, a projection of the cylindrical mirror on the first surface has a first side and a second side opposite to each other in an extension direction, and the first side and the second side are wave curves, and the first side and the second side are mirrored.

Preferably, the texture structure comprises a first cylindrical mirror and a second cylindrical mirror, the first cylindrical mirror has a first side and a second side, and the second cylindrical mirror has a third side and a fourth side that are mirrored, the second side and the third side are arranged adjacently and in parallel. The decorative film can show well-spaced highlights and light and shadow stripes.

Preferably, the first side, the second side, the third side, and the fourth side are cosine or sine curves, and the dot textures and the color matching textures are formed by staggering and corresponding setting of peaks and valleys, and thus the superior optical effect and quality are presented.

Preferably, the support layer is a residual adhesive layer and the texture structure is formed by UV resin embossing.

Preferably, the support layer is a PET layer and the texture structure is printed on the PET layer.

Preferably, the support layer is a colored UV resin that provides colors to the decorative film, so that the rendered colors are matched with the light and shadow effects and the gorgeous effects are exhibited.

Preferably, the decorative film further comprises a base layer on which the support layer is provided. For example, the base layer is made of PET, PC and PMMA.

Preferably, the decorative film further comprises a reflective layer and a colored layer. The reflective layer is overlaid on the texture structure and the colored layer is overlaid on the reflective layer.

The technical solutions of the present disclosure will be further described in detail below in various embodiments in connection with the accompanying drawings. However, the selected embodiments are only used to describe the present disclosure, rather than limiting the scope of the present disclosure.

Figure 2:
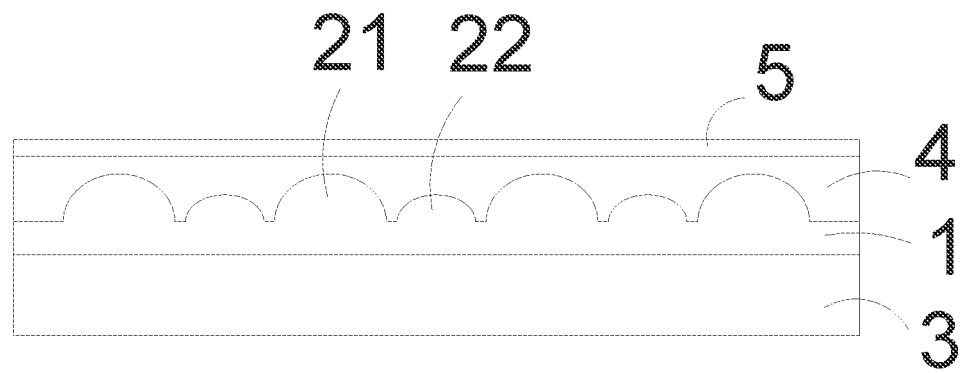
FIG. 2 is a schematic cross-sectional view illustrating a decorative film according to the present disclosure.

Referring to FIGS. 1 and 2, a decorative film 100 according to a first embodiment of the present disclosure comprises a support layer 1 and a texture structure. The support layer comprises a first surface 11 and a second surface 12 opposite to each other. The texture structure is provided on the first surface 11 of the support layer 1. The first surface 11 defines a plurality of dots P. The texture structure is provided at each of the dots P with dot textures 21 showing light and shadow highlights and color matching textures 22 located between the dot textures 21 for color matching. Setting the dot textures 21 on the preset dots P enables the decorative film 100 to show the light and shadow highlights, and setting the color matching textures at the non-dotted patterns, thereby preventing too large overall color differences from affecting aesthetics, and therefore, the more excellent overall visual effects are exhibited.

Specifically, referring to FIG. 1 for the arrangement of the plurality of dot textures 21. The dot textures 21 in a first row and the dot textures 21 in a second row are misaligned, and the color matching textures 22 are interspersed between the dot textures 21. The well-spaced dot textures 21 are not arranged densely or monotonously, and thus have the excellent decorative effects.

Specifically, length and width of the dot textures 21 are defined as L1 and W1, respectively, for example, L1=0.4 mm and W1=0.3 mm. The spacing between two adjacent dot textures is D1 along a length direction of the dot textures 21, for example, D1=0.4 mm. The spacing between two adjacent dot textures 21 is D2 along a width direction of the dot textures 21, for example, D2=0.45 mm.

Specifically, length and width of the color matching textures 22 is defined as L2 and W2, respectively, for example, L2=0.04 mm and W2=0.02 mm. In the case where the spacing between the dot textures 21 is large, the color difference is prevented from being visually too large.

Referring to FIG. 2, the decorative film 100 further comprises a substrate 3, a reflective layer 4, and a colored layer 5. The support layer 1 is a UV resin layer, and the texture structure is embossed on the UV resin layer. Of course, the UV resin layer can also be other heat-curable adhesive layer or light-curable adhesive layer. The substrate 3 can be made of materials such as PET, PC, or PMMA. The reflective layer 4 is silk-screened or evaporated on the first surface 11 and covers the texture structure, and the colored layer 5 is silk-screened on the reflective layer. For example, the colored layer 5 is a bright black ink layer. The cross-sectional shapes of the dot textures 21 and the color matching textures 22 are similar to a bow shape. In other embodiments, the cross-sectional shapes can also be a triangle, a semicircle, a trapezoid, a rectangle, a polygon, or an irregular shape. Preferably, the UV resin layer can also be a color adhesive layer.

Figure 3:
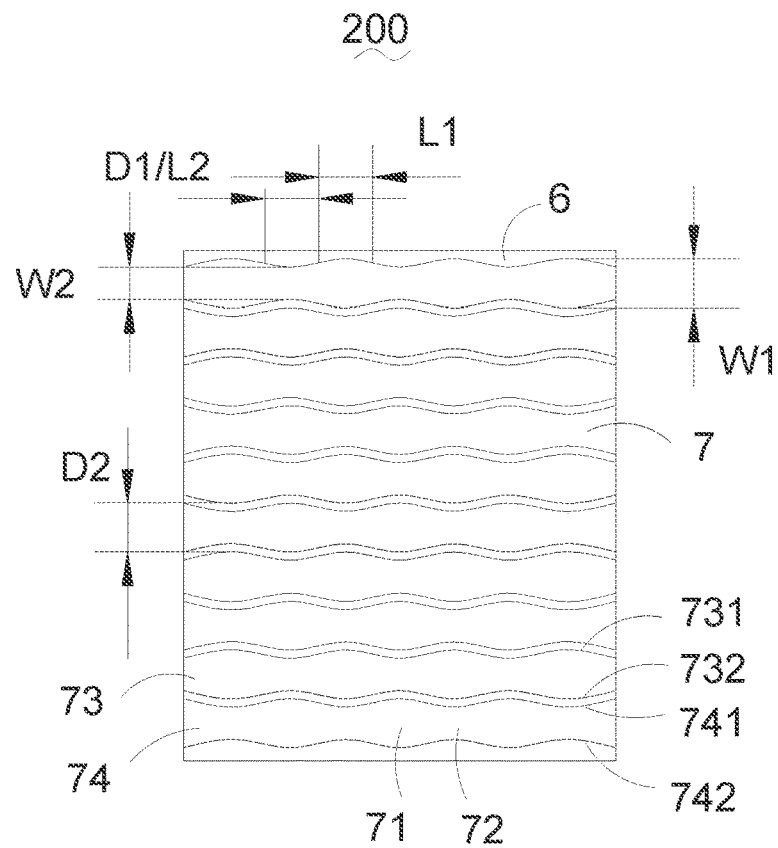
FIG. 3 is another schematic top view illustrating a decorative film of the present disclosure.

Referring to FIG. 3, a decorative film 200 according to a second embodiment of the present disclosure comprises a support layer 6 and a texture structure. The texture structure is provided on the support layer 6. The texture structure comprises a plurality of cylindrical mirrors 7 having uneven widths forming dot textures 71 on a wide portion and forming color matching textures 72 on a narrow portion. The dot textures 71 and the color matching textures 72 are set by the width of the cylindrical mirrors 7. The simple design, the uncomplicated process, and the excellent highlight effects are exhibited. The plurality of cylindrical mirrors 7 are arranged in rows, and the dot textures of two adjacent cylindrical mirrors are misaligned. Specifically, one dot texture 71 of one cylindrical mirror 7 corresponds to a spacing between two adjacent dot textures 71 of another cylindrical mirror. The dot textures 71 and the color matching textures 72 are smoothly connected.

Preferably, the dot textures 71 have L1 of 0.5 mm and W1 of 0.4 mm. The color matching textures have L2 of 0.5 mm and W2 of 0.05 mm. The adjacent dot textures 71 have D1 of 0.5 mm along the length direction and D2 of 0.5 mm along the width direction. This is only one example of dimensions, and is not limited thereto.

Preferably, the texture structure comprises a first cylindrical mirror 73 and a second cylindrical mirror 74. The first cylindrical mirror 73 has a first side 731 and a second side 732, and the second cylindrical mirror 74 has a third side 741 and a fourth side 742. The first side to the fourth side are viewed from a projection angle as shown in FIG. 3, and can be confirmed according to the cross-sectional shape of the cylindrical mirror in practice. The first side to the fourth side are cosine or sine curves, and the dot textures and color matching textures are formed by staggering and corresponding setting of peaks and valleys. The first side 731 and the second side 732 are mirrored. The third side 741 and the second side 742 are mirrored. The adjacent second side 732 and third side 741 are arranged in parallel, that is, the spacing between the second side 732 and the second side 741 is always equal from one end to the other end of the cylindrical mirror.

The side curves of the first cylindrical mirror 73 and the second cylindrical mirror 74 change, so that the decorative film 200 can also show light and shadow stripes in the arrangement direction. Light and shadow dot textures and light and shadow stripes appear simultaneously, thereby further enhancing the decorative effect.

Figure 4:
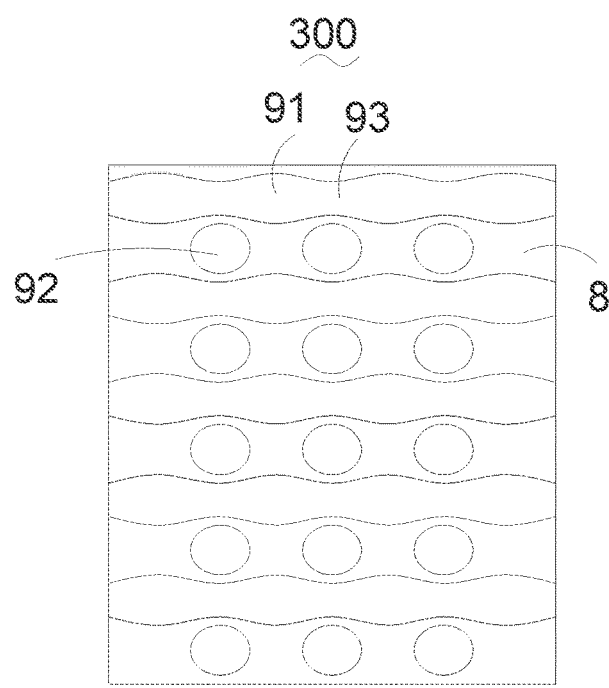
FIG. 4 is a further schematic top view illustrating a decorative film of the present disclosure.

Referring to FIG. 4, a decorative film 300 according to a third embodiment of the present disclosure comprises a support layer 8 and a texture structure. The texture structure comprises a first dot texture 91, a second dot texture 92, and color matching textures 93. The first dot texture 91 and the color matching textures 93 are arranged on a cylindrical mirror in an intersecting manner. The second dot texture 92 is provided between the color matching textures 93 of the two cylindrical mirrors. The first dot texture 91 and the color matching textures 93 are continuously and smoothly connected and the light and shadow stripes can also be shown. The good decorative effect and high recognition are exhibited.

The present disclosure further provides a cover of electronic equipment comprising the decorative film. The cover of electronic equipment can exhibit a variety of visual effects with gorgeous colors, vivid pictures and good appearance.

It should be appreciated that the above embodiments merely represent part of embodiments of the present disclosure. It should be noted that those skilled in the art can make other improvements and modifications without departing from the principle of the present disclosure, and the improvements and modifications shall be included into the protection scope of the present disclosure.

The invention claimed is:

1. A decorative film, comprising:
   a support layer comprising a first surface and a second surface opposite to each other;
   a texture structure provided on the first surface of the support layer;
   wherein the first surface defines a plurality of dots, and the texture structure is provided with dot textures showing light and shadow highlights at each of the dots and color matching textures located between the dot textures for color matching;
   wherein length and width of the dot textures are defined respectively as L1 and W1, then 0.1 mm≤L1≤1 mm, 0.05 mm≤ W1≤0.5 mm, and a spacing between adjacent dot textures is greater than 0.05 mm;
   wherein length and width of the color matching textures are defined respectively as L2 and W2, then L2 and/or W2 is less than 0.05 mm; and
   wherein the dot textures in adjacent rows are misaligned; and wherein the texture structure comprises a plurality of cylindrical mirrors variable in width forming the dot textures on a wide portion and forming the color matching textures on a narrow portion, and wherein a projection of the cylindrical mirror on the first surface has a first side and a second side opposite to each other in an extension direction, and the first side and the second side are mirrored.

2. The decorative film according to claim 1, wherein a spacing between the two adjacent dot textures is D1 along a length direction of the dot textures, then $0.1\ mm \leq D1 \leq 0.5\ mm$; and a spacing between the two adjacent dot textures is D2 along a width direction of the dot textures, then $0.05\ mm \leq D2 \leq 0.5\ mm$.

3. The decorative film according to claim 1, wherein the plurality of cylindrical mirrors are arranged in rows, and the dot textures of two adjacent cylindrical mirrors are misaligned or arranged on the same axis.

4. The decorative film according to claim 1, wherein the plurality of cylindrical mirrors are arranged in rows, and the dot textures are provided between the color matching textures of two adjacent cylindrical mirrors.

5. The decorative film according to claim 1, wherein the plurality of cylindrical mirrors are arranged in rows, the dot textures and color matching textures on the same cylindrical mirror are connected in arc line shape or straight line shape, and the decorative film shows light and shadow stripes along an arrangement direction.

6. The decorative film according to claim 1, wherein and the first side and the second side are wave curves, and the first side and the second side are mirrored.

7. The decorative film according to claim 1, wherein the texture structure comprises a first cylindrical mirror and a second cylindrical mirror, the first cylindrical mirror has a first side and a second side, and the second cylindrical mirror has a third side and a fourth side that are mirrored, and the second side and the third side are arranged adjacently and in parallel.

8. The decorative film according to claim 1, wherein dot textures are provided between the color matching textures of the adjacent rows.

* * * * *